Patented Jan. 19, 1932

1,842,103

UNITED STATES PATENT OFFICE

CLEMENS A. LAISE, OF NORTH BERGEN, NEW JERSEY, ASSIGNOR TO EISLER ELECTRIC CORPORATION, OF NEWARK, NEW JERSEY, A CORPORATION OF DELAWARE

REFRACTORY MATERIAL

No Drawing. Application filed July 3, 1930. Serial No. 465,854.

My invention relates to a process for making hard products. By it I am enabled to make articles and products out of materials of great hardness, such as tungsten carbide and the like, suitable for use in the manufacture of high speed cutting tools and other instruments requiring very sharp, hard edges, grinding implements, wire-drawing dies, watch jewels, swaging and punching dies and the like. The new material produced by my process, which I also claim herein, may be used in the arts to replace the diamond and the present high speed steels and abrasives for grinding wheels, cutting tools and the like.

In its preferred form, my present process starts with a refractory carbide like tungsten carbide in a state of extremely fine sub-division and compreses said carbide, mixed preferably with a small percentage of boron nitride, to the shape of the article under the high pressure of five to twenty tons per square inch. The process then proceeds to bake the carbide piece to increase its porosity. After this, the baked piece is mechanically worked to sharpen its cutting edges, if any, or to finish its surfaces which can be done at this time because, although the piece is now a fairly hard compact body, nevertheless it can still be quite readily ground and shaped. The baked piece after being mechanically finished is then immersed in or otherwise impregnated with a molten base metal of preferably the iron group, such as cobalt, so as to absorb the base metal which, by reason of its having intimately penetrated the pores of the piece in a molten condition, alloys or merges with the refractory carbide or carbides which in the main make-up the body of the piece. Finally, any excess surface of the cobalt or other base metal is removed from the piece by mechanically machining it or dissolving it off so as to expose the piece in its finished form for use.

In my United States Patent No. 1,633,258 of June 21, 1927, I have disclosed a method of making wear-resistant articles out of a finely divided refractory metal such as tungsten made up into a body whose pores were filled with a molten base metal such as copper, cobalt, etc., to cause the finely divided tungsten particles to cohere. My present invention, both as to its process and products, differs materially from the foregoing in important respects, such as, for example, the following.

It applies its process to refractory carbides such as tungsten carbide instead of to metallic tungsten. It produces extremely hard and adequately tough alloys suitable for high speed tools and the like and abrasives and for wire-drawing dies, watch jewels and many other articles suited to its properties, whereas the metallic bodies made by my patented process are especially useful for bodies subjected to considerable wear such as bearings, electrodes for spot welding, switchboard contacts and the like.

A further difference from my previous process is that I press and shape the article out of the tungsten carbide or the like by a high pressure of five to fifty tons to the square inch instead of only two to five tons per square inch as in the patented process. This, coupled with the fact that I apply this high pressure to the tungsten carbide and other material in an extremely fine state of sub-division, leads to the resultant article having an extremely fine grain when completed in accordance with the process which adapts it for the purposes indicated of cutting tools, dies, watch-jewels, and the like.

My present process further differs from the previously patented process in that after the article has been pressed and shaped as aforesaid under high pressure out of extremely fine material, and has been baked as hereinafter described, I then proceed by my present process to grind or otherwise mechanically surface the baked piece or body to give it substantially its final form, including the sharpening of any cutting edges it may have or otherwise shaping and finishing it, if it be a watch-jewel or the like. Whereas the body or article after baking is a fairly hard compact body, nevertheless it can still be ground or mechanically worked at this time into its finished form as to contour, surface or cutting edge.

I will now describe an illustrative instance of a preferred process within my present invention and the resultant product but, of course, without limiting the invention thereto except as required by the claim. I first prepare or acquire a finely divided refractory metallic carbide such as tungsten carbide, uranium carbide, molybdenum carbide, titanium carbide, beryllium carbide, chromium carbide, etc. I may take 97½% by weight of tungsten carbide, ½% of boron nitride and 2% of beryllium carbide, all in finely divided form well mixed together. This mixture I then compress into the desired pieces or shapes by subjecting the powder to a pressure of about five to twenty tons per square inch. In some cases I use an organic binder to hold the compressed material together, although in other cases no binder is necessary. I may also substitute for the boron nitride and beryllium carbide other metallic carbides which may also have an added hardening effect.

I then bake the compacted body at a temperature of about 900° to 1000° C. for a longer or shorter time, depending on the mass and degree of porosity of the core material, in a vacuum or in a reducing or inert gaseous atmosphere. At this temperature no sintering takes place in the mass but if boron nitride or other nitrogen metal compound be present, decomposition of these nitrides occurs and the liberated nitrogen increases both the hardness and porosity of the body. This increased porosity facilitates the impregnation of the mass by the base metal.

I then grind or shape the baked piece into the finished form desired for its cutting edges or surfaces; and then intimately impregnate it by immersion or in any desired or preferred manner with the molten base metal, such as cobalt or nickel. For instance, the piece may be immersed in a bath of the molten base metal in a suitable receptacle exhausted of air; or the piece contained in the receptacle connected with an exhaust pump may have the air exhausted from its pores, after which the molten base metal may be admitted thereto without breaking the vacuum; or the piece may be immersed in a bath of the molten metal, suitable arrangement being made to keep the piece submerged. Instead of a vacuum, a reducing or inert gaseous atmosphere may be used for this step of the process. Also, pressure may be applied to the molten metal in the receptacle with the object of still further compelling it to penetrate through the pores of the article. The time for effecting the impregnation will depend upon the conditions, including the size and shape of the article under treatment. This accomplished, the article is withdrawn from the bath and allowed to cool, after which any outer adhering film of the base metal on the piece may then be machined off or removed by any other method, such as by chemically dissolving it down to the actual outlines and surfaces of the piece which then emerge, whereupon the article is to all intents finished except possibly for a final finishing of any cutting edges or polishing of its surfaces.

Under these conditions, the refractory carbides of the article and the molten base metal alloy or merge with one another. The 2% beryllium ingredient in the illustrative process serves to give additional hardness to the product. Instead of the carbide of beryllium I may, however, substitute metallic beryllium powder and obtain similar effects. The boron nitride also contributes increased hardness.

The proportions given in the illustrative process may be varied within considerable limits. Thus, a refractory composition of great hardness and toughness is obtainable by the process wherein the tungsten carbide ingredient may vary from about 65 to 93% by weight with the beryllium carbide ingredient varying from about 1 to 5% and the boron nitride varying from about $\frac{1}{10}$ to 1%. In this composition, the nickel or cobalt ingredient may vary from about 5 to 35% by weight.

For base metals I can use a considerable variety such as any metal of the iron group,—as nickel, cobalt or iron,—and can use also other metals such as aluminum, etc., and thereby in connection with the refractory carbides produce hard tenacious bodies or articles useful for many purposes in the arts.

What I claim is:

A new composition of matter characterized by being a hard refractory, said composition consisting mainly of tungsten carbide impregnated with a metal of the iron group up to 35% of the total weight, said composition further containing a substantial amount of beryllium up to 5% of the total sufficient to increase the hardness of the composition.

In witness whereof, I have hereunto subscribed my name this 17th day of June, 1930.

CLEMENS A. LAISE.